United States Patent
Al-Ghamdi

(10) Patent No.: US 12,129,722 B2
(45) Date of Patent: Oct. 29, 2024

(54) DRILL CUTTINGS HANDLING AND SHIPPING SYSTEM

(71) Applicant: SAUDI ARABIAN OIL COMPANY, Dhahran (SA)

(72) Inventor: Bakr Abdulrahim Al-Ghamdi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/156,932

(22) Filed: Jan. 19, 2023

(65) Prior Publication Data

US 2024/0247555 A1 Jul. 25, 2024

(51) Int. Cl.
  *E21B 21/06* (2006.01)
  *B65G 65/44* (2006.01)

(52) U.S. Cl.
  CPC ............ *E21B 21/066* (2013.01); *B65G 65/44* (2013.01)

(58) Field of Classification Search
  CPC ............................... E21B 21/066; B65G 65/44
  See application file for complete search history.

(56) References Cited

U.S. PATENT DOCUMENTS

| | | | |
|---|---|---|---|
| 6,170,580 B1 | 1/2001 | Reddoch | |
| 6,279,471 B1 * | 8/2001 | Reddoch | E21B 21/066 100/106 |
| 6,345,672 B1 * | 2/2002 | Dietzen | E21B 41/005 175/207 |
| 6,585,115 B1 * | 7/2003 | Reddoch | E21B 41/0057 175/207 |
| 6,910,411 B2 | 6/2005 | Reddoch | |
| 7,971,657 B2 | 7/2011 | Hollier et al. | |
| 9,074,441 B2 | 7/2015 | Addison et al. | |
| 2006/0102390 A1 * | 5/2006 | Burnett | B65G 53/66 95/271 |
| 2007/0215386 A1 | 9/2007 | Burnett et al. | |
| 2008/0128173 A1 | 6/2008 | Hollier et al. | |
| 2008/0230491 A1 * | 9/2008 | Wick | B03B 9/02 210/512.1 |
| 2010/0181265 A1 * | 7/2010 | Schulte, Jr. | B07B 1/4609 209/397 |
| 2011/0005832 A1 * | 1/2011 | McDonald | E21B 21/065 175/5 |

(Continued)

FOREIGN PATENT DOCUMENTS

| | | |
|---|---|---|
| EP | 2165951 A1 | 3/2010 |
| WO | 2014176601 A1 | 10/2014 |

*Primary Examiner* — Taras P Bemko
(74) *Attorney, Agent, or Firm* — Vorys, Sater, Seymour and Pease LLP

(57) ABSTRACT

A system for separating drill cuttings from a drilling fluid and transporting the drill cuttings from a wellbore includes a multi-chambered collection bin defining a first chamber and a second chamber therein separated by a screen partition. An unloading bulk conveyor is operably coupled to the first chamber for unloading drill cuttings from the first chamber and a suction pump is operably coupled to the second chamber for drawing drilling fluid from the second chamber. Drill cuttings may be unloaded from the first chamber onto a transport vehicle for delivery to a disposal site. The drilling fluid may be pumped from the second chamber and recirculated through the wellbore.

16 Claims, 3 Drawing Sheets

(56) References Cited

U.S. PATENT DOCUMENTS

| | | | |
|---|---|---|---|
| 2012/0193146 A1* | 8/2012 | James | E21B 21/066 175/66 |
| 2017/0252676 A1* | 9/2017 | Ross | B01D 21/01 |
| 2020/0165904 A1* | 5/2020 | McNabb | E21B 21/066 |
| 2021/0404334 A1* | 12/2021 | Kulkarni | E21B 44/00 |

* cited by examiner

DRILL CUTTINGS HANDLING AND SHIPPING SYSTEM

FIELD OF THE DISCLOSURE

The present disclosure relates generally to drilling subterranean wellbores for the recovery of hydrocarbons and other natural resources. More particularly, the disclosure relates to the collection of drill cuttings for transport and disposal.

BACKGROUND OF THE DISCLOSURE

To drill a subterranean wellbore, a drill bit is rotated at the end of a tubular drill string. A drilling fluid or "drilling mud" is pumped through the drill string to the drill bit where it is expelled through nozzles into the wellbore. The drilling fluid serves to cool and lubricate the drill bit and also to carry drill cuttings and other debris to the surface. The drill cuttings and other solids may be removed from the drilling fluids such that the drilling fluids may be recirculated through the wellbore. When the drill cuttings are carried to the surface, they may become contaminated with lubricants and other chemical additives present in the drilling fluids. Thus, the disposal of the drill cuttings may be environmentally hazardous, particularly in the marine environment of an offshore drilling platform, and is thus often controlled by governmental regulations The management of drill cuttings on an offshore drilling platform begins with the removal of the drill cuttings from the drilling fluid. Initially, vibratory separators may be employed to remove most of the drilling fluid, additives and oily residue from the drill cuttings. The drill cuttings may then be loaded into collection receptacles often referred to as "skips". Skips are available in various sizes and configurations, but are generally configured as fluid-tight bins with an open or flat top. Once a skip is filled, it may weigh up to 30 tons. The filled skip must be lifted with a crane or other heavy equipment to be loaded onto a ship for transport to shore, while an empty skip may be maneuvered into position to replace the filled skip.

This "skip and ship" process has several limitations. For example, the skips occupy valuable space on an offshore drilling rig and must be inspected regularly to ensure safety given the rigorous handling of the skips. Additionally, valuable drilling fluids often remain with the drill cuttings loaded into the skips, which may not be recovered for recirculation through the wellbore.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a system for separating drill cuttings from a drilling fluid and transporting the drill cuttings from a wellbore includes a multi-chambered collection bin defining a first chamber and a second chamber separated by a screen partition. An unloading bulk conveyor is operably coupled to the first chamber for unloading drill cuttings from the first chamber, and a suction pump is operably coupled to the second chamber for drawing drilling fluid from the second chamber.

In another embodiment, a method of separating drill cuttings from a drilling fluid and transporting the drill cuttings from a wellbore includes (a) loading the drill cuttings and the drilling fluid into a first chamber of a multi-chambered collection bin, (b) flowing a portion of the drilling fluid from the first chamber to a second chamber of the multi-chambered collection bin through a screen partition disposed within the multi-chambered collection bin, (c) unloading the drill cuttings from the first chamber into a transport vehicle and (d) pumping the portion of the drilling fluid from the second chamber.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
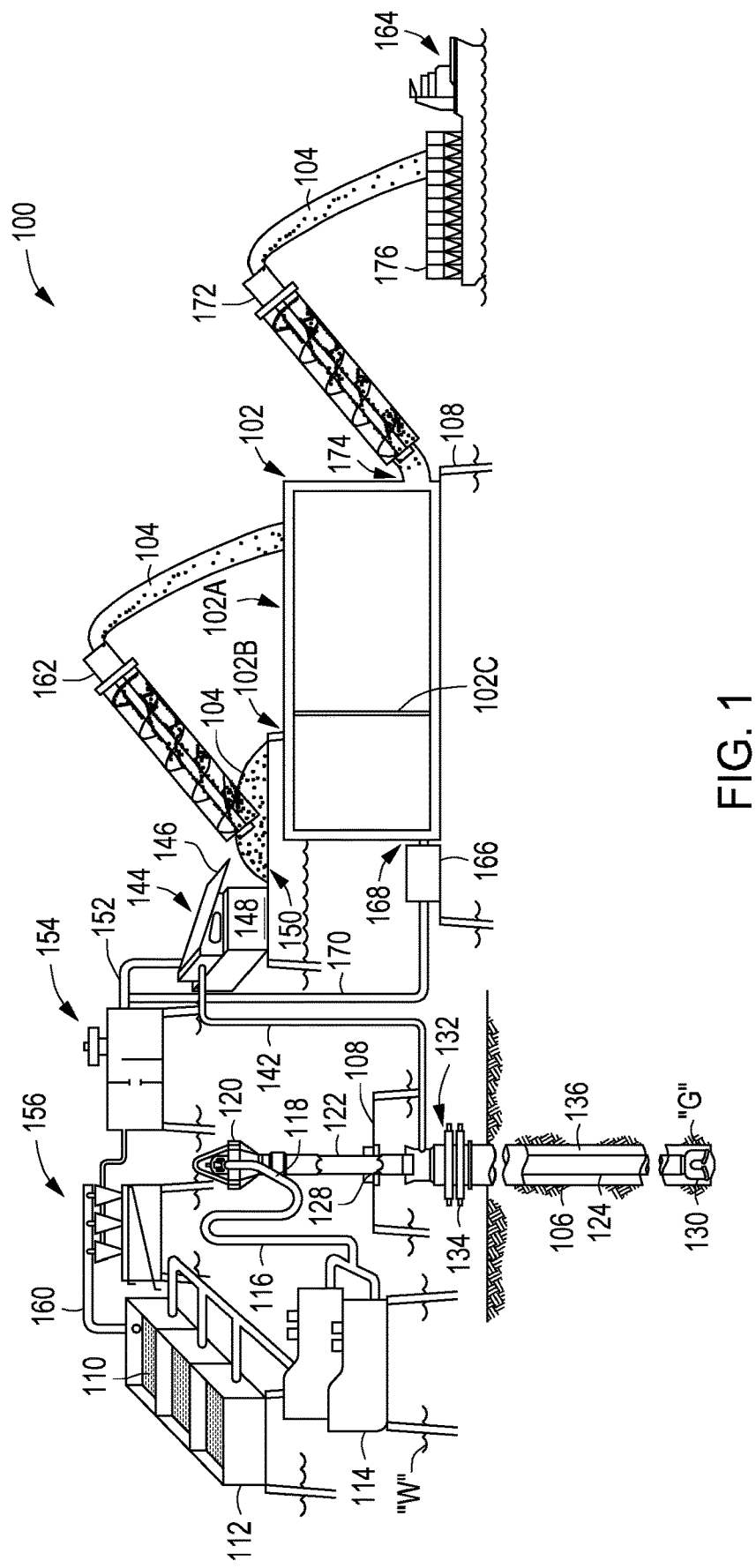
FIG. 1 is a schematic process-flow diagram of a drilling fluid and cuttings management system illustrating a multi-chambered cuttings collection bin in accordance with one or more aspects of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to a drill cuttings management system for the transport and disposal of drill cuttings generated by drilling a subterranean wellbore. The system may include a multi-chambered cuttings collection bin where drill cuttings may be loaded by a screw conveyor after being processed by a vibratory separator. A screen partition defined between chambers of the collection bin allow for further separation of liquid drilling fluids from the drill cuttings. The cuttings may be loaded onto a ship by another screw conveyor while the liquid drilling fluids may be recirculated through the wellbore.

FIG. 1 is a schematic view of a drilling fluid and cuttings management system 100. The system 100 includes a multi-chambered cuttings collection bin 102 in which drill cuttings 104 may be collected in accordance with one or more exemplary embodiments of the disclosure. The drill cuttings 104 may be generated by drilling a wellbore 106 through a geologic formation "G." Wellbore 106 extends from a surface location "S," which is a seabed or other underwater surface in the illustrated example embodiment illustrated in FIG. 1. In other embodiments, the principles of the disclosure may be practiced with a wellbore 106 extending from a terrestrial surface location "S."

At a water surface "W," an offshore platform 108 supports facilities for extracting, storing and processing drilling fluids as described herein. Offshore platform 108 is illustrated schematically in FIG. 1 as a floating platform including several individual components, but it should be appreciated that any of the equipment described herein for processing drilling fluids, including the multi-chambered cuttings collection bin 102, may be supported on a single offshore platform 108. In other embodiments, floating platform 108 may be replaced by a barge or a platform fixed to the seabed without departing from the scope of the disclosure.

Clean drilling fluid 110 may be stored in mud tanks 112 supported on the floating platform 108. As used herein, "clean" drilling fluid includes drilling fluids in which a substantial amount of drill cuttings 104 and other impurities have been removed. Chemical additives may be added to the clean drilling fluids 110 in the mud tanks 112 to achieve desired fluid properties such as density and viscosity. The clean drilling fluid 110 may be drawn into mud pumps 114 that apply the necessary pressure to circulate the drilling fluid 110 through the various drilling equipment and the wellbore 106.

The mud pumps 114 pump the clean drilling fluid 110 up through a stand pipe 116 and a rotary hose 118 into the drilling equipment. The drilling equipment generally includes a swivel 120, which supports a kelly 122 and a drill string 124 that extends into the wellbore 106. The kelly 122 is rotated by a rotary table 128 such that the drill string 124 and a drill bit 130 supported at a downhole end of the drill string 124 also rotate. In other applications, however, the drill string 124 may alternatively be rotated downhole through the use of a mud pump or the like. The drill string 124 extends through a wellhead 132, which may include blow-out preventers 134 and other equipment to manage the fluids flowing into and out of the wellbore 106. The clean drilling fluid 110 passes through the swivel 120, the kelly 122, the drill string 124 and the drill bit 130 before being expelled through the drill bit 130 into an annulus 136 defined between the drill string 124 and an inner wall of the drilled wellbore 106.

In the annulus 136, returning drilling fluids 110 cool and lubricate the drill bit 130 and carry drill cuttings 104 from the bottom of the wellbore 106 to the surface location "S." The drilling fluid 110 exits the wellbore 106 and carries the drill cuttings 104 through a mud return line 142 to a vibratory separator 144, which may also be known as a shale shaker or shaker table. Vibratory separator 144 may include an inclined sieve or screen 146 upon which the drilling fluid 110 and cuttings 104 are deposited. The screen 146 vibrates causing the drilling fluids 110 to separate from the cuttings and pass through the screen 146 into a reservoir 148. The large drill cuttings 104 tumble down the incline and accumulate at a base 150 of the vibratory separator 144.

The drilling fluid 110 in the reservoir 148 may include smaller solids such as sands and silts that may have passed through the screen 146 of the vibratory separator 144. The drilling fluid 110 is drawn out of the reservoir 148 through a conduit 152, and is delivered into a de-sander 154. The de-sander 154 may pass the drilling fluids 110 through a series of hydro-cyclones that spin the drilling fluids 110 and cause smaller solids (sand) to separate from the drilling fluid 110 under the force of gravity. After passing through the de-sander 154, the drilling fluids 110 are passed through a de-silter 156. The de-silter 156 may operate in a similar manner as the de-sander 154 to remove even finer particles (silt) from the drilling fluid 110. After passing through the de-silter 156, clean drilling fluid 110 passes through a conduit 160 back into the mud tank 112. The clean drilling fluid 110 may then be recirculated through the wellbore 106.

The drill cuttings 104 that accumulate at the base 150 of the vibratory separator 144 may have some remaining drilling fluid 110 mixed among the drill cuttings 104. In some instances, for example, the inclined screen 146 may become clogged such that the drilling fluid 110 may not readily pass into the reservoir 148. Moreover, the drill cuttings 104 may still be coated with drilling fluid 110 that may not have had time to separate from the drill cuttings 104 before the drill cuttings 104 tumbled down the inclined screen 146. The coated drill cuttings 104 must be removed from the floating platform 108 according to any relevant regulatory standards. Any of the remaining drilling fluid 110 that is transported from the floating platform 108 will occupy valuable space in the transport vehicle 164, e.g., a supply boat. These drill cuttings 104 will not be available for recirculation through the wellbore 106 and may present an environmental hazard when the drill cuttings 104 arrive at the disposal site (not shown).

According to embodiments of the present disclosure, the system 100 further includes the multi-chambered cuttings collection bin 102 (hereafter "the collection bin 102") operable and otherwise configured to remove some of the remaining drilling fluid 110 from the drill cuttings 104 deposited in the base 150 of the vibratory separator 144. To accomplish this, the drill cuttings 104 deposited into the base 150 may be conveyed to the collection bin 102. A first or "loading" bulk conveyor 162, such as screw conveyor, drag conveyor, belt conveyor, etc., may load the drill cuttings 104 into a first chamber 102A through the upper end of the collection bin 102. A second chamber 102B of the collection bin 102 is separated from the first chamber 102A by a screen partition 102C. The screen partition 102C may permit passage of the drilling fluids 110 from the first chamber 102A to the second chamber 102B, while retaining the dry drill cuttings 104 within the first chamber 102A. In some embodiments, the screen partition 102C may be constructed with openings therein that are similarly sized to openings defined in the inclined screen 146 of the vibratory separator 144.

A suction pump 166 is fluidly coupled the second chamber 102B through a port 168 defined at a lower end of the collection bin 102. The suction pump 166 draws drilling fluid 110 from the bottom of the second chamber 102B and delivers the drilling fluid 110 to the de-sander 154 through a conduit 170. Any drilling fluid 110 recovered from the second chamber 102B may then be returned to the cleaned drilling fluids 110 to be recirculated through the wellbore 106, as generally described above.

The drill cuttings 104 in the first chamber 102A may be transported from the collection bin 102 to the transport vehicle 164 by a second or "unloading" bulk conveyer 172. The unloading bulk conveyor 172 may be similar to or the same as the loading bulk conveyor 162, and thus may constitute a screw conveyor, a drag conveyor, a belt conveyor, etc. The drill cuttings 104 may be fed into the second bulk conveyor 172 through an opening 174 defined at a lower end of the second chamber 102A. Since the drill cuttings 104 are loaded into the upper end of the collection bin 102 and unloaded from the lower end, the drill cuttings 104 may be processed through the collection bin 102 in a First-In-First-Out (FIFO) method. This method allows for sufficient time to elapse with the drill cuttings within the collection bin 102 to permit any drilling fluids 110 to separate (drain) from the drill cuttings 104 under natural forces of drainage and gravity. The drill cuttings 104 conveyed by the second bulk conveyor 172 may be deposited into a large hold 176 of the transport vehicle 164 for transport to the shore. Once at the shore, the drill cuttings 104 may be transported by truck to a disposal site.

The system 100 eliminates the need for traditional mud skips and all of the hazards and logistics of handling such skips. Since the drill cuttings 104 loaded onto the transport vehicle 164 are relatively dry, less storage space on the floating platform 108 will be required than in a conventional "skip and ship" system.

In other embodiments (not shown), for example in terrestrial applications, the transport vehicle 164 may be a truck or another terrestrial transport. The unloading bulk conveyor 172 may transport drill cuttings 104 from the first chamber 102A directly to the truck for further transport and disposal.

Figure 2:
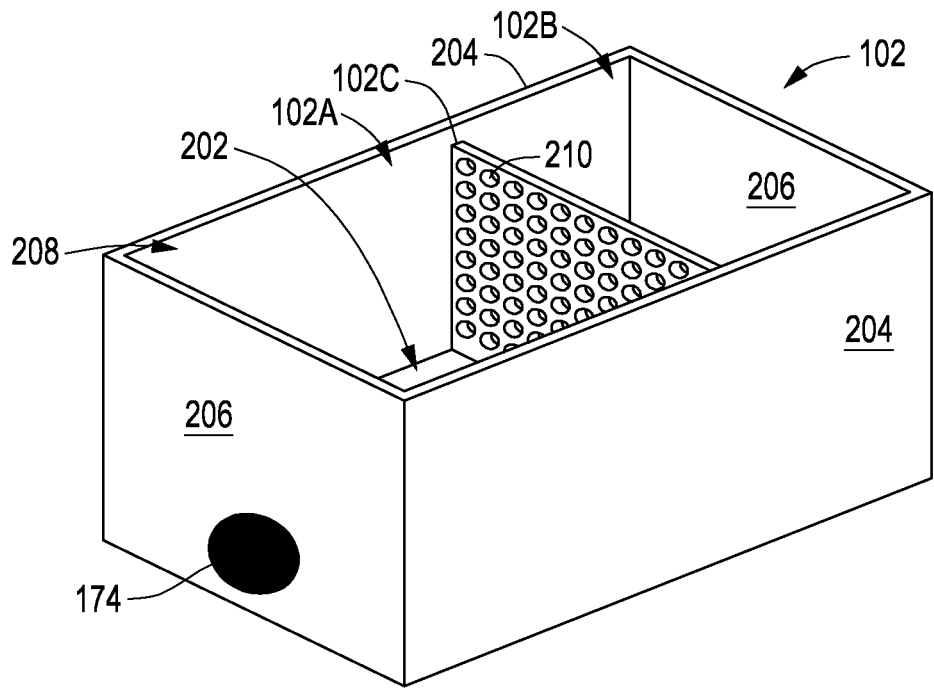
FIG. 2 is a perspective view of the multi-chambered cuttings collection bin of FIG. 1 illustrating a vertical screen partition defied between chambers of the collection bin.

Referring to FIG. 2, one example of the multi-chambered collection bin 102 is illustrated. In the illustrated embodiment, the collection bin 102 includes a generally rectangular base 202 with two sidewalls 204 and two end walls 206 each extending vertically from outer edges of the base 202. The first chamber 102A and the second chamber 102B are defined within an open space between the sidewalls 204 and the end walls 206. The first and second chambers 120A, 102B are illustrated with an open top 208, in other words, the collection bin 102 may comprise an open top vessel. In other embodiments, the second chamber 102B may be covered to prevent inadvertent loading (receipt) of drill cuttings 104 (FIG. 1) into the second chamber 102B. The opening 174 is defined through a lower end of an end wall 206 forming part of the first chamber 102A, which provides the unloading bulk conveyor 172 (FIG. 1) access to the interior of the first chamber 102A. The opening 168 (FIG. 1) that provides the suction pump 166 (FIG. 1) access to the second chamber 102BA may be provided through an opposite end wall 206. In other example embodiments, the opening 168 may be provided through one of the sidewalls 204 or through the base 202, without departing from the scope of the disclosure.

The screen partition 102C may be a rectangular plate that is positioned vertically with respect to the base 202 and extending laterally between the opposing sidewalls 204. In some embodiments, as illustrated, the first chamber 102A may be larger than the second chamber 102B, but could alternatively be smaller than the second chamber 102B, without departing from the scope of the disclosure. The screen partition 102C may be permanently installed in some example embodiments by welding or similar fabrication techniques. In other example embodiments, the screen partition 102C may be removable to facilitate maintenance and replacement of the screen partition 102C. The screen partition 102C includes a plurality of openings 210 extending therethrough that may be sized to prevent passage of the drill cuttings 104 while permitting passage of the drilling fluid 110 into the second chamber 102B.

Figure 3A:
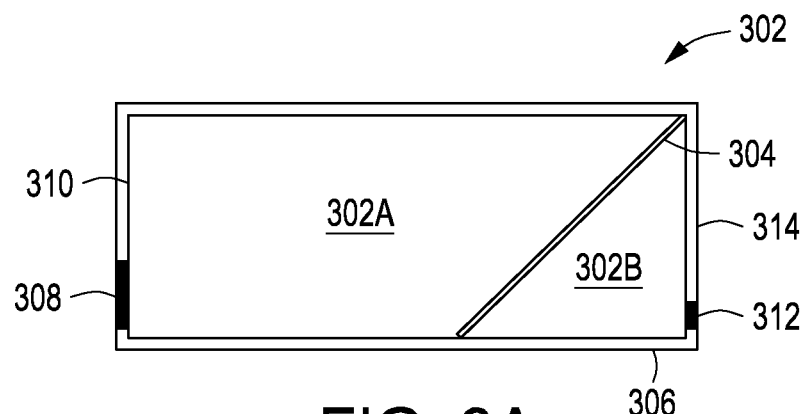
FIGS. 3A and 3B are front views of alternate multi-chambered cuttings collection bins with a diagonal screen partition and a horizontal screen partition, respectively.

Referring to FIG. 3A, in an alternate embodiment, a multi-chambered collection bin 302 may include screen partition 304 arranged at an angle offset from perpendicular and otherwise diagonally with respect to a base 306. The screen partition 304 divides the interior of the collection bin 302 into first chamber 302A and a second chamber 302B. The screen partition 304 covers the second chamber 302B such that drill cuttings 104 (FIG. 1) loaded into the first chamber 302A from the upper end of the collection bin 302 will be prohibited from entering the second chamber 302B. Opening 308 is defined through an end wall 310 at a lower end thereof. The opening 308 extends into the first chamber 302A and may provide access for an unloading bulk conveyor 172 to remove dry drill cuttings 104 from the first chamber 302A. Similarly, opening 312 is defined through an opposite end wall 314 at a lower end thereof. The opening 312 extends into the second chamber 302B and may provide access for a suction pump 166 (FIG. 1) to remove drilling fluids 110 from the second chamber 302B.

Figure 3B:
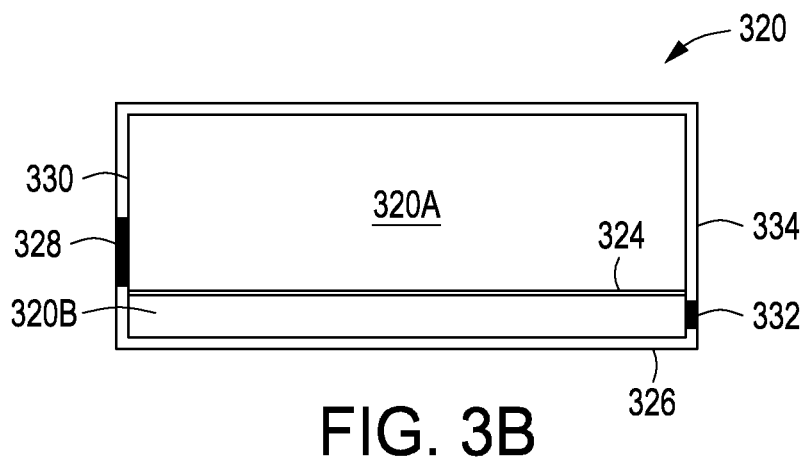

Referring to FIG. 3B, in an alternate embodiment, a multi-chambered collection bin 320 may include a screen partition 324 arranged horizontally or generally parallel with a base 326. The screen partition 324 divides the interior of the collection bin 320 into a first chamber 320A and a second chamber 320B. In the illustrated embodiment, the screen partition 324 covers the second chamber 320B such that drill cuttings 104 (FIG. 1) loaded into the first chamber 320A from the upper end of the collection bin 320 will be prohibited from entering the second chamber 320B. Opening 328 is defined through an end wall 330 at a lower end of the first chamber 320A but at a location above the screen partition 324. The opening 328 extends into the first chamber 320A and may provide access for an unloading bulk conveyor 172 (FIG. 1) to remove dry drill cuttings 104 from the first chamber 320A. Similarly, opening 332 is defined through an opposite end wall 334 at a lower end thereof. The opening 332 extends into the second chamber 320B and may provide access for a suction pump 166 (FIG. 1) to remove drilling fluids 110 from the second chamber 302B.

Figure 4:
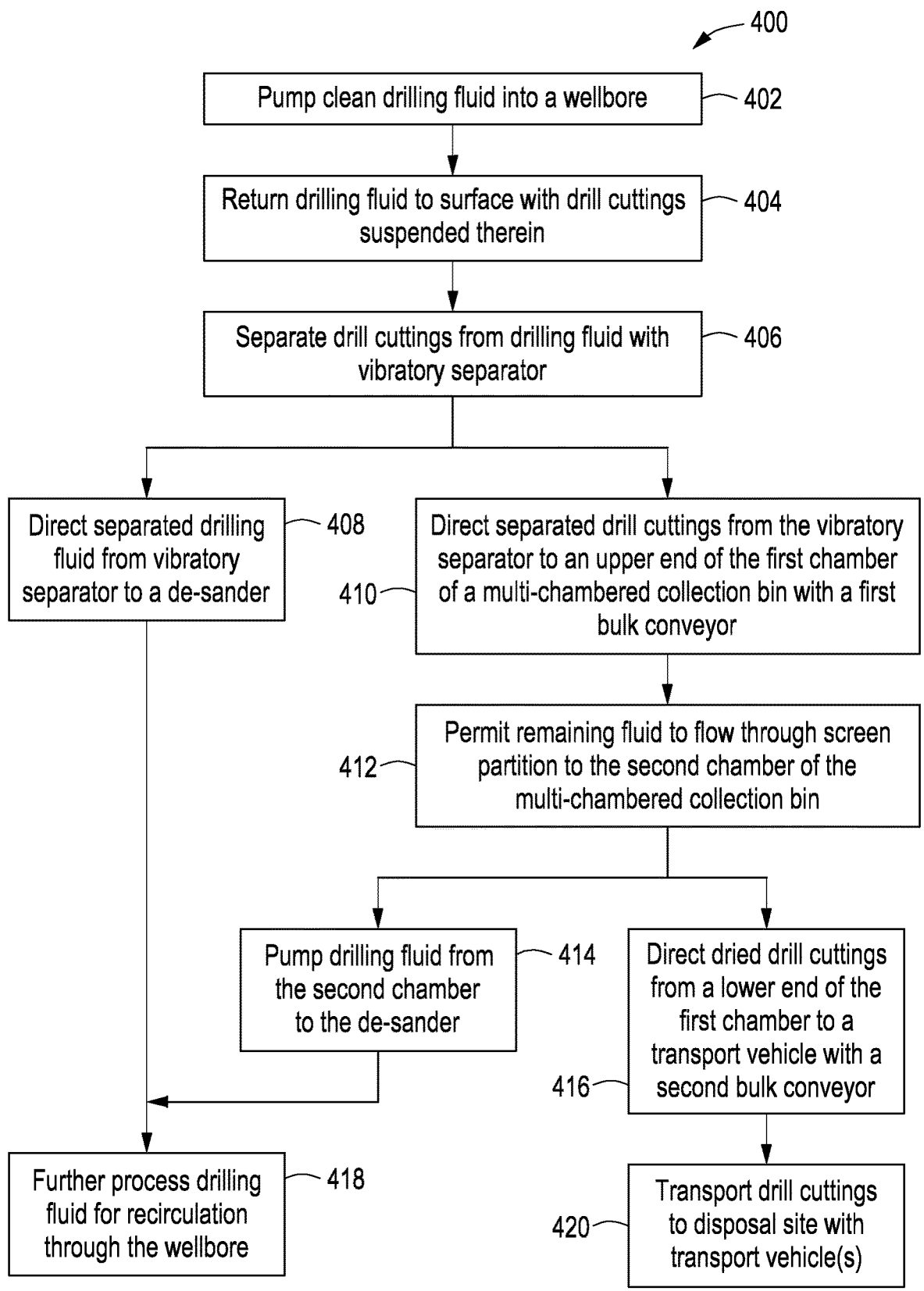
FIG. 4 is a flowchart illustrating a procedure for collecting and transporting drill cuttings in accordance with embodiments of the present disclosure.

Referring to FIG. 4, and with continued reference to FIGS. 1 through 3B, an example procedure 400 for managing drilling fluid 110 and drill cuttings 104 in a wellbore drilling operation is illustrated. Initially at step 402, a clean drilling fluid 110 is pumped into a wellbore 106. The drilling fluid 110 may be pumped by mud pumps 114 supported on a floating platform 108 for offshore applications or with mud pumps supported on the ground in terrestrial applications. The clean drilling fluid 110 is directed to drill bit 130, which generates drill cuttings 104 as the geologic formation "G" is penetrated. Next at step 404, the drilling fluid 110 is returned from the wellbore 106 with drill cuttings 104 generated by the drill bit.

At step 406, an initial separation of the drilling fluid 110 and the cuttings 104 is performed. A vibratory separator 144 may be employed to vibrate the drill cuttings 104 and collect any of the drilling fluid 110 that is dislodged from the drill cuttings 104. The separated drilling fluid 110 may be directed to a de-sander 154 or other equipment for further processing in step 408. The separated drill cuttings 104 may be directed to a multi-chambered collection bin 102 in step 410. The drill cuttings 104 may be conveyed from the vibratory separator 144 and loaded into the collection bin 102 with a loading bulk conveyor 162 such as a screw conveyor or similar mechanism. The drill cuttings 104 may be loaded into the first chamber 102A of the collection bin 102 through the open top 208.

At step 412 the further separation of the drilling fluid and the drill cuttings may be permitted as drilling fluid 110 that remains on drill cuttings 104 flows under the force of gravity to a lower end of the collection bin 102. At least a portion of the drilling fluid 110 flows through the screen partition 102C and accumulates in the second chamber 102B of the collection bin 102. As the drilling fluid 110 is settling and flowing into the second chamber 102B, additional drill cuttings 104 may be loaded into the first chamber 102A in a continuous loading process.

The drilling fluid 110 may be pumped from the second chamber 102B to the de-sander 144 in step 414 for further processing. The dried drill cuttings 104 may be conveyed from the first chamber 102A in step 416. The drill cuttings 104 may be unloaded through the opening 174 at the lower end of the first chamber 102A by unloading bulk conveyor 172. The unloading bulk conveyor may deliver the drill cuttings 104 directly to a transport vehicle 164 such as a supply boat. In some embodiments, the drill cuttings 104 are deposited into a large hold 176 of the supply boat 164.

In step 418 the drilling fluid 110 is directed from the de-sander 154 for further processing. The drilling fluid 110 may be directed through de-silter 156 and collected in mud tanks 112. Once collected in the mud tanks 112, the drilling fluid 110 is available for recirculation through the wellbore 106. The drilling fluid 110 may flow continuously through the system 100 as each of steps 402 through 418 may be completed simultaneously and continuously.

At step 420, the drill cuttings 104 may be transported to a disposal site with the transport vehicle. For example, the transport vehicle 164 such as a supply boat may carry the drill cuttings 104 to the shore or another terrestrial location where they may be unloaded. In some embodiments, the drill cuttings 104 are unloaded onto trucks or another transport vehicle for delivery to a disposal site. In other embodiments, the drill cuttings 104 may be loaded directly onto trucks with the unloading bulk conveyor 172, e.g., in terrestrial wellbore drilling applications. In this manner, the drill cuttings 104 may be safely and efficiently delivered to the disposal site without many of the dangers and inefficiencies of many of the conventional "skip and ship" processes.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system for separating drill cuttings from a drilling fluid and transporting the drill cuttings from a wellbore, the system comprising:
    an offshore platform;
    a transport vehicle remote from the offshore platform and operable to carry drill cuttings from the offshore platform;
    a vibratory separator disposed on the offshore platform, the vibratory separator including a vibrating screen for separating the drilling fluids from the drill cuttings;
    a multi-chambered collection bin disposed on the offshore platform, the multi-chambered collection bin defining a first chamber to receive the drill cuttings and remaining drilling fluid mixed among the drill cuttings from the vibratory separator and a second chamber separated from the first chamber by a stationary screen partition;
    an unloading bulk conveyor operably coupled directly between the first chamber and the transport vehicle for unloading drill cuttings from the first chamber directly to the transport vehicle; and
    a suction pump operably coupled to the second chamber for drawing drilling fluid from the second chamber.

2. The system of claim 1, wherein the multi-chambered collection bin includes an open upper end for loading drill cuttings and drilling fluid into the first chamber and wherein the unloading bulk conveyor is operably coupled to the first chamber through an opening defined at a lower end of the first chamber.

3. The system of claim 2, further comprising a a loading bulk conveyor arranged for conveying the drill cuttings and the remaining drilling fluid from a base of the vibratory separator to the open upper end of the multi-chambered collection bin.

4. The system of claim 3, further comprising a de-sander operably coupled to the vibratory separator and the suction pump for receiving the drilling fluid from each of the vibratory separator and the suction pump.

5. The system of claim 1, wherein the screen partition is arranged vertically with respect to a base of the multi-chambered collection bin.

6. The system of claim 1, wherein the screen partition is arranged diagonally or horizontally with respect to a base of the multi-chambered collection bin.

7. The system of claim 1, wherein the transport vehicle is a supply boat with a hold arranged for receiving the drill cuttings from the unloading bulk conveyor.

8. The system of claim 1, wherein the unloading bulk conveyor protrudes over an edge of the offshore platform.

9. The system of claim 1, wherein the suction pump is fluidly coupled to the wellbore such that drilling fluid drawn from the second chamber may be returned to the wellbore via the suction pump.

10. A method of separating drill cuttings from a drilling fluid on an offshore platform and transporting the drill cuttings from the offshore platform, the method comprising:
    loading the drill cuttings and the drilling fluid into a first chamber of a multi-chambered collection bin disposed on the offshore platform;
    flowing a portion of the drilling fluid from the first chamber to a second chamber of the multi-chambered collection bin through a screen partition disposed within the multi-chambered collection bin;
    unloading the drill cuttings from the first chamber directly off the offshore platform and into a transport vehicle remote from the offshore platform with an unloading bulk conveyor; and
    pumping the portion of the drilling fluid from the second chamber.

11. The method of claim 10, wherein unloading the drill cuttings from the first chamber includes:
    conveying the drill cuttings from the first chamber with the unloading bulk conveyor; and
    depositing the drill cuttings in an open hold of a supply boat comprising the transport vehicle with the unloading bulk conveyor.

12. The method of claim 11, wherein loading the drill cuttings and the drilling fluid into the first chamber includes depositing the drill cuttings and the drilling fluid through an open upper end of the multi-chambered collection bin, and wherein unloading the drill cuttings includes conveying the drill cuttings from an opening defined at a lower end of the first chamber with the unloading bulk conveyor.

13. The method of claim 10, further comprising circulating the drilling fluid through a wellbore prior to loading the drilling fluid into the first chamber and subsequent to pumping the drilling fluid from the second chamber.

14. The method of claim 10, further comprising vibrating the drill cuttings with a vibratory separator prior to loading the drill cuttings into the first chamber.

15. The method of claim 14, wherein loading the drill cuttings and the drilling fluid into the first chamber includes:
    conveying the drill cuttings and the drilling fluid from a base of the vibratory separator to the first chamber with a loading bulk conveyor; and
    depositing the drill cuttings and the drilling fluid into the first chamber with the loading bulk conveyor.

16. The method of claim 10, further comprising transporting the drill cuttings from the offshore platform to a terrestrial location with the transport vehicle.

* * * * *